(12) United States Patent
Siefert

(10) Patent No.: US 6,698,921 B2
(45) Date of Patent: *Mar. 2, 2004

(54) PREDICTIVE TEMPERATURE MEASUREMENT SYSTEM

(75) Inventor: Robert J. Siefert, Escondido, CA (US)

(73) Assignee: Alaris Medical Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/809,591

(22) Filed: Mar. 14, 2001

(65) Prior Publication Data

US 2002/0003832 A1 Jan. 10, 2002

Related U.S. Application Data

(63) Continuation of application No. 09/313,911, filed on May 18, 1999, now Pat. No. 6,270,252.

(51) Int. Cl.⁷ .............................. G01K 3/04; G01K 3/00; G01K 7/00; G01K 5/22; G01K 1/14; A61B 5/01
(52) U.S. Cl. ................. 374/169; 374/107; 374/208; 600/549
(58) Field of Search ................. 374/169, 102, 374/103, 104, 1, 2, 107, 208; 600/549, 484

(56) References Cited

U.S. PATENT DOCUMENTS

| | | | |
|---|---|---|---|
| 2,755,999 A | 7/1956 | Vickers | 236/69 |
| 3,111,032 A | 11/1963 | Wormser et al. | 73/359 |
| 3,878,724 A | 4/1975 | Allen | 73/362 |
| 3,942,123 A | 3/1976 | Georgi | 328/1 |
| 3,978,325 A | 8/1976 | Goldstein et al. | 235/151.3 |
| 4,068,526 A | 1/1978 | Goldstein | 73/362 |
| 4,158,965 A | 6/1979 | Prosky | 73/362 |
| 4,565,456 A | 1/1986 | Iida et al. | 374/169 |
| 4,629,336 A | 12/1986 | Ishizaka | 374/169 |
| 4,727,500 A | 2/1988 | Jackson et al. | 364/557 |
| 4,811,198 A | 3/1989 | Ota et al. | 374/169 |
| 4,836,442 A | 6/1989 | Beckey | 236/46 |
| 4,843,577 A | 6/1989 | Muramoto | 364/557 |
| 4,877,333 A | 10/1989 | Ota et al. | 374/169 |
| 4,878,184 A | 10/1989 | Okada et al. | 364/557 |
| 4,986,669 A | 1/1991 | Yamaguchi | 374/107 |
| 5,011,294 A | 4/1991 | Yamaguchi | 374/107 |
| 5,015,102 A | 5/1991 | Yamaguchi | 374/107 |
| 5,066,141 A | 11/1991 | Ikeda et al. | 374/169 |
| 5,186,136 A * | 2/1993 | Kadomukai et al. | 123/192.1 |
| 5,392,031 A | 2/1995 | Toriumi et al. | 340/588 |
| 5,473,629 A | 12/1995 | Muramoto | 374/102 |
| 5,509,422 A | 4/1996 | Fukami | 128/670 |
| 5,519,303 A | 5/1996 | Goedken et al. | 320/35 |
| 5,623,935 A | 4/1997 | Faisandier | 128/696 |
| 5,632,555 A | 5/1997 | Gregory et al. | 374/102 |
| 5,738,441 A | 4/1998 | Cambridge et al. | 374/102 |
| 5,743,267 A | 4/1998 | Nikolic et al. | 128/673 |
| 6,000,846 A | 12/1999 | Gregory et al. | 374/164 |
| 6,036,361 A | 3/2000 | Gregory et al. | 374/185 |
| 6,083,172 A | 7/2000 | Baker, Jr. et al. | 600/500 |

FOREIGN PATENT DOCUMENTS

| | | | | |
|---|---|---|---|---|
| EP | 0 332 700 A1 | 9/1989 | | G01K/7/00 |
| JP | 60-114731 | 6/1985 | | G01K/7/00 |
| JP | 62-175627 | 8/1987 | | G01K/7/00 |
| WO | WO 97/03340 | 1/1997 | | G01K/7/42 |

* cited by examiner

Primary Examiner—Gail Verbitsky
(74) Attorney, Agent, or Firm—Fulwider Patton Lee & Utecht, LLP

(57) ABSTRACT

A method and device for rapidly predicting the temperature of an object through a sensor reading of the object's temperature by using a processor comprising finite impulse response (FIR) filters to determine the average value, the first derivative, and the second derivative of the sensed temperature based upon a predetermined number of temperature samples, apply a respective weighting factor to each of the average value, the first derivative, and the second derivative respectively, and calculate a temperature estimate by combining the weighted average value, the first derivative, and second derivative together with an offset factor.

17 Claims, 6 Drawing Sheets

PREDICTIVE TEMPERATURE MEASUREMENT SYSTEM

This is a continuation of patent application Ser. No. 09/313,911, filed May 18, 1999, now U.S. Pat. No. 6,270, 252.

BACKGROUND

The present invention relates generally to improvements in thermometers and, more particularly, to electronic thermometers for more rapidly obtaining accurate temperature measurements.

It is common practice in the medical field to determine the body temperature of a patient by means of a temperature sensitive device that not only measures the temperature but also displays that temperature. Such temperature measurements are taken routinely in hospitals and in doctors' offices. One such device is a glass bulb thermometer incorporating a heat responsive mercury column that expands and contracts adjacent a calibrated temperature scale. Typically, the glass thermometer is inserted into the patient, allowed to remain inserted for a sufficient time interval to enable the temperature of the thermometer to stabilize at the body temperature of the patient, and subsequently removed for reading by medical personnel. This time interval is usually on the order of 3 to 8 minutes.

The conventional temperature measurement procedure using a glass bulb thermometer or the like is prone to a number of significant deficiencies. Temperature measurement is rather slow and, for patients who cannot be relied upon (by virtue of age or infirmity) to properly retain the thermometer for the necessary period of insertion in the body, may necessitate the physical presence of medical personnel during the relatively long measurement cycle, thus diverting their attention from other duties. Furthermore, glass bulb thermometers are not as easy to read and, hence, measurements are more susceptible to human error, particularly when the reading is made under poor lighting conditions or when read by harried personnel.

Various attempts have been made to minimize or eliminate these deficiencies of the glass bulb thermometer by using temperature sensing probes that are designed to operate in conjunction with direct-reading electrical thermometer instrumentation. In one such approach, an electric temperature sensitive device, such as a thermistor, is mounted at the end of a probe and inserted into the patient. The change in voltage or current of the device, depending on the particular implementation, is monitored and when that output signal stabilizes, a temperature is displayed in digital format. This is commonly referred to as the "direct reading" approach and it reduces the possibility of error by misreading the measured temperature. This approach has provided a significant contribution to the technology of temperature measurement.

An inherent characteristic of electronic thermometers is that they do not instantaneously measure the temperature of the site to which they are applied. It may take a substantial period of time before the temperature sensitive device stabilizes at the temperature of the site and the temperature indicated by the thermometer is representative of the actual temperature of the body or site measured. This lag is caused by the various components of the measurement system that impede heat flow from the surface of the body or site to the temperature sensor. Some of the components are the sensor tip, the tissue of the body, and any hygienic covering applied to the sensor tip to prevent contamination between measurement subjects.

One attempt to shorten the amount of time required to obtain a temperature reading of a subject involves the use of a temperature sensitive electronic probe coupled with prediction or estimation circuitry or programming to provide a digital display of the patient's temperature before the probe has reached equilibrium with the patient. With this approach, assuming the patient's temperature is not significantly changing during the measurement period or cycle, the temperature that will prevail upon thermal stabilization of the electronic thermometer with the patient is predicted from measured temperatures and is displayed before thermal stabilization is attained. Typically, prediction of temperature is performed by monitoring the measured temperature over a period of time as well as the rate of change thereof, and processing these two variables to predict the patient's temperature.

With an electronic thermometer that operates by predicting the final, steady state temperature, an advantage is that the temperature measurement is completed before thermal stabilization is attained, thereby reducing the time required for measurement. This would lessen the risk that the patient would not hold the probe in the correct position for the entire measurement period and requires less time of the attending medical personnel. Another advantage is that because body temperature is dynamic and may significantly change during the five minute interval typically associated with traditional mercury glass thermometer measurements, a rapid determination offers more timely diagnostic information. In addition, the accuracy with which the temperature is predicted improves markedly as the processing and analysis of the data are more accurately performed. This approach has also contributed significantly to the advancement of temperature measurement technology.

Electronic thermometers using predictive-type processing and temperature determination may include a thermistor as a temperature-responsive transducer. The thermistor approaches its final steady state temperature asymptotically with the last increments of temperature change occurring very slowly, whereas the major portion of the temperature change occurs relatively rapidly. Prior attempts have been made to monitor that initial, more rapid temperature change, extract data from that change, and predict the final temperature at which the thermistor will stabilize and therefore, determine the actual temperature of the tissue that is contacting the thermistor long before the thermistor actually stabilizes at the tissue temperature.

A prior approach used to more rapidly predict the tissue temperature prior to the thermistor reaching equilibrium with that tissue is the sampling of data points of the thermistor early in its response and from those data points, predicting a curve shape of the thermistor's response. From that curve shape, an asymptote of that curve and thus the stabilization, or steady state, temperature can be predicted. To illustrate these concepts through an example of a simpler system, consider the heat transfer physics associated with two bodies of unequal temperature, one having a large thermal mass and the other having a small thermal mass, placed in contact with each other at time t=0. As time progresses, the temperature of the small thermal mass and the large thermal mass equilibrate to a temperature referred to as the stabilization temperature. The equation describing this process is as follows:

$$T(t)=T_R+(T_F-T_R)(1-e^{-(t/\tau)})=T_F-(T_F-T_R)e^{-(t/\tau)} \quad \text{(Eq. 1)}$$

where:

T(t) is the temperature of the smaller body as a function of time, $T_R$ is the initial temperature of the smaller body,
$T_F$ is the actual, steady state temperature of the system,
t is time, and
τ is the time constant of the system.

From this relationship, when T is known at two points in time, for example $T_1$ at time $t_1$ and $T_2$ at time $t_2$, the stabilization temperature $T_F$ can be predicted through application of Equation 2 below.

$$T_F = \frac{T_2 - T_1 e^{-\frac{t_2-t_1}{\tau}}}{1 - e^{-\frac{t_2-t_1}{\tau}}} = \frac{T_2 e^{\frac{t_2}{\tau}} - T_1 e^{\frac{t_1}{\tau}}}{e^{\frac{t_2}{\tau}} - e^{\frac{t_1}{\tau}}} \qquad (\text{Eq. 2})$$

Further, for a simple first order heat transfer system of the type described by Equation 1, it can be shown that the natural logarithm of the first time derivative of the temperature is a straight line with slope equal to $-1/\tau$ as follows:

$$\ln\left(\frac{dT}{dt}\right) = K - \frac{t}{\tau} \qquad (\text{Eq. 3.1})$$

and also:

$$T_F = T(t) + \tau T'(t) \qquad (\text{Eq. 3.2})$$

where:

$$\tau = -\frac{T'(t)}{T''(t)} \qquad (\text{Eq. 3.3})$$

where:
K=a constant dependent upon $T_R$, $T_F$, and τ,
T'=first derivative
T"=second derivative Prior techniques have attempted to apply these simple first order relationships through the use of thermistor time constants established by the thermistor manufacturer. However, these techniques have failed to recognize that the temperature response curve cannot be modeled as first order and is to a great extent affected by factors not reflected by the thermistor's time constant. When the thermometer is placed in contact with body tissue, such as a person's mouth for example, the response curve depends on the physical placement of the probe in relation to that tissue, on the heat transfer characteristics of the particular tissue, and on the hygienic cover that separates the probe from the tissue. All of these factors contribute to the heat flow characteristics of the measurement system and they are not represented in the factory-supplied time constant of the thermistor alone. Moreover, the factors described above impede the flow of heat in series and with different resistance characteristics, thus causing an overall time response behavior that is not that of a first order system.

While electronic thermometers and prior predictive techniques have advanced the art of electronic thermometry, a need still exists for an electronic thermometer that can predict a stabilization temperature at an early stage of the measurement process and thereby shorten the amount of time taken to obtain a final temperature reading. Additionally, a need exists for a thermometer having an algorithm that can be computed in readily available, relatively simple, relatively inexpensive circuitry or processors. The invention fulfills these needs and others.

SUMMARY OF THE INVENTION

Briefly and in general terms, the present invention is directed to providing an electronic thermometer and a method for determining the temperature of an object or biological subject by predicting the steady state temperature at an early stage of the measurement process. The thermometer and method of the present invention relate certain variables determined from an early portion of the temperature rise curve to the predicted steady state temperature so that the predictive process requires a reduced process of data acquisition and a shortened data processing time while yielding accurate approximations of the stabilization temperature.

Thus, briefly and in general terms, in one aspect of the present invention is directed to a thermometer incorporating a temperature sensor, a processor for predicting an object's temperature based on the average value, slope, and curvature of the initial reading of the object's temperature, and a display for displaying the predicted temperature.

In a more detailed aspect, the processor comprises a finite impulse response filter connected so as to sample the temperature signal a plurality of times to calculate an estimate of the temperature of the subject and provide an estimated final temperature signal and a display connected with the processor to receive and display the estimated final temperature signal. In yet further detail, the finite impulse response filter takes a linear combination of a plurality of samples in calculating the estimate of the temperature of the subject. In another aspect, the processor adds an offset coefficient based on ambient temperature to the estimate of the temperature provided by the finite impulse response filter in providing an estimated final temperature signal.

In another aspect, a thermometer for determining the temperature of an object is provided and comprises a sensor that provides a time varying temperature signal in response to sensing the temperature of the object, a processor that receives the temperature signal, samples the temperature signal over a time frame, determines the average value, the first derivative, and the second derivative of the signal over the time frame, combines the average value, first derivative, and second derivative, and thus calculates an estimate of the temperature of the object. In a more detailed aspect, the processor applies a weighting factor to each of the average value, the first derivative, and the second derivative of the signal, and further adds an offset factor selected in accordance with the ambient temperature, to calculate a prediction of the temperature of the object.

In further detailed aspects, the processor further comprises finite impulse response filters to calculate the average value, slope, and curvature of the temperature data. In a more detailed aspect, the processor continues to sample the signal and calculate a new prediction for the temperature of the object with each new temperature data value sampled.

In another detailed aspect, the processor monitors a predetermined number of the last predicted temperatures and calculates the final predicted temperature of the object based on an average of these last predicted temperatures. In yet another detailed aspect, the processor calculates the final predicted temperature when certain selected conditions have been met. In a still further aspect, the selected conditions include a predetermined time period that must lapse after the sensor has been in contact with the object, predetermined threshold values that the first derivative and the second derivative must reach, and a maximum difference between any two of a predetermined number of the last temperature estimates that must be less than a predetermined threshold.

These and other features and advantages of the present invention will become apparent from the following more detailed description, when taken in conjunction with the accompanying drawings which illustrate, by way of example, the principles of the invention.

DETAILED DESCRIPTION OF THE PREFERRED EMBODIMENTS

Figure 1:
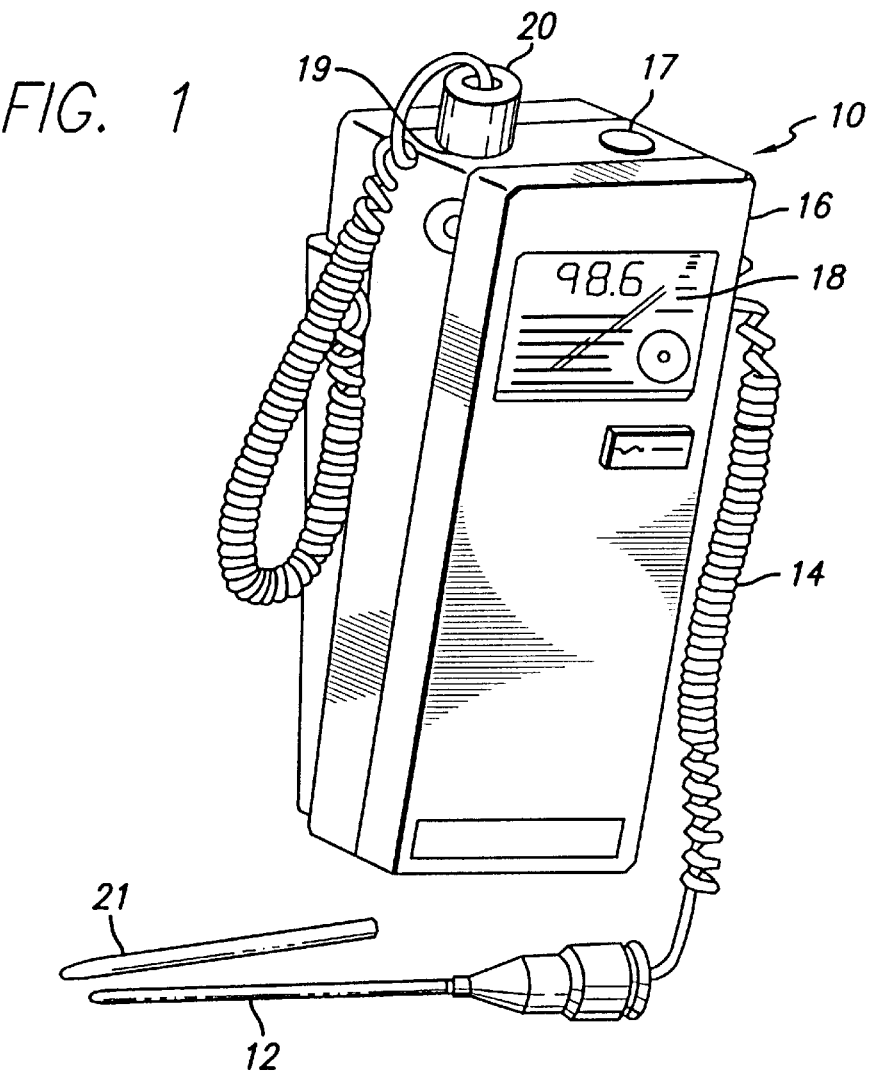
FIG. 1 is a view of an electronic clinical thermometer incorporating aspects of the present invention.

In the following description, like reference numerals will be used to refer to like or corresponding elements in the different figures of the drawings. Although temperatures are given in both Fahrenheit and Celsius, the parameters provided are used with only Fahrenheit. Parameters usable for Celsius have not been provided although temperatures have been provided in both Fahrenheit and Celsius.

Referring now to the drawings, and particularly to FIG. 1, there is shown one embodiment of an electronic thermometer incorporating novel features of the present invention. The electronic thermometer 10 contains a probe 12 for sensing the temperature of a selected part of the body, connected by conductors 14 to the main body 16 of the thermometer. As shown in FIG. 1, the probe 12 has been removed from a storage well 17 in the main body. The main body 16 of the thermometer contains the electrical components and power supply of the thermometer, and also has a display 18 for displaying temperature values and error or alarm messages. A second probe 20 is included with the thermometer and is shown in the stored position inserted in a well 19 of the main body 16. Also shown is a hygienic cover 21 for placement over a probe 12 or 20 before insertion of the probe into the patient.

Figure 2:
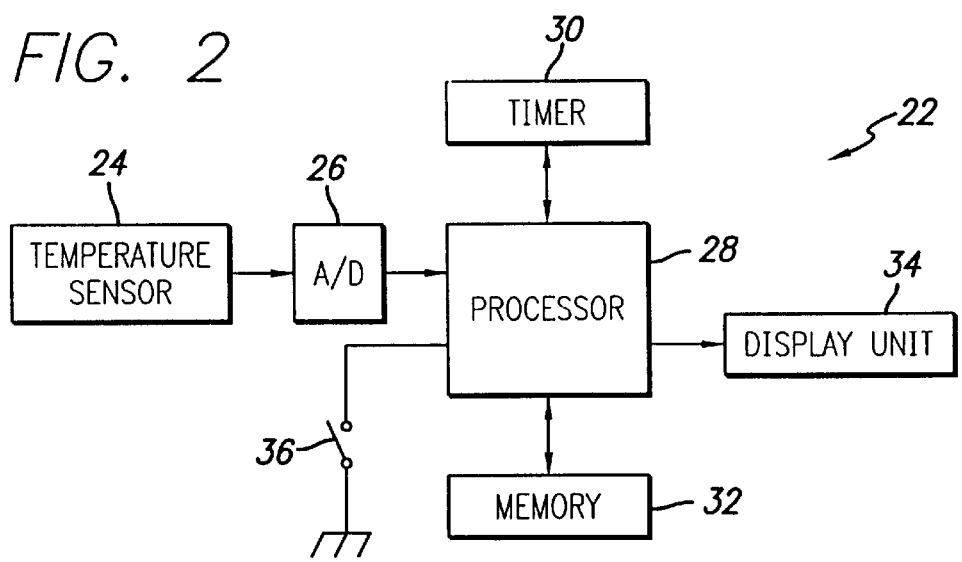
FIG. 2 is a block diagram of a system in accordance with aspects of the present invention for determining the temperature of an object before final equilibrium of the temperature sensor with the object using the thermometer shown in FIG. 1.

Referring to FIG. 2, the block diagram generally shows major electronic components of one embodiment of a thermometer 22 in accordance with the present invention. The temperature sensor 24 provides temperature signals in response to the temperature sensed during measurement. In the case where a thermistor is used as the temperature sensor 24, these signals are analog voltages or currents representative of the resistance of the thermistor and therefore representative of the sensed temperature. They are converted into digital form for further processing by an analog-to-digital converter 26. The analog-to-digital converter 26 is connected to a processor 28 that receives the digital temperature signals and processes them to determine the temperature of the subject being measured. A timer 30 provides time signals to the processor 28 used during the processing of the temperature signals, and a memory 32 stores the temperature and time signal data so that the signal data can be analyzed at a subsequent time. The memory 32 also stores empirically-derived constants used by the processor 28 to calculate the predicted temperature. Once the signals have been processed, the processor 28 provides a signal to the display 34 to display the predicted stabilization temperature. Activating a switch 36 enables the temperature measurement functions of the thermometer 22. This switch is preferably located within the probe storage well such that removal of the probe enables the measurement.

Figure 3:
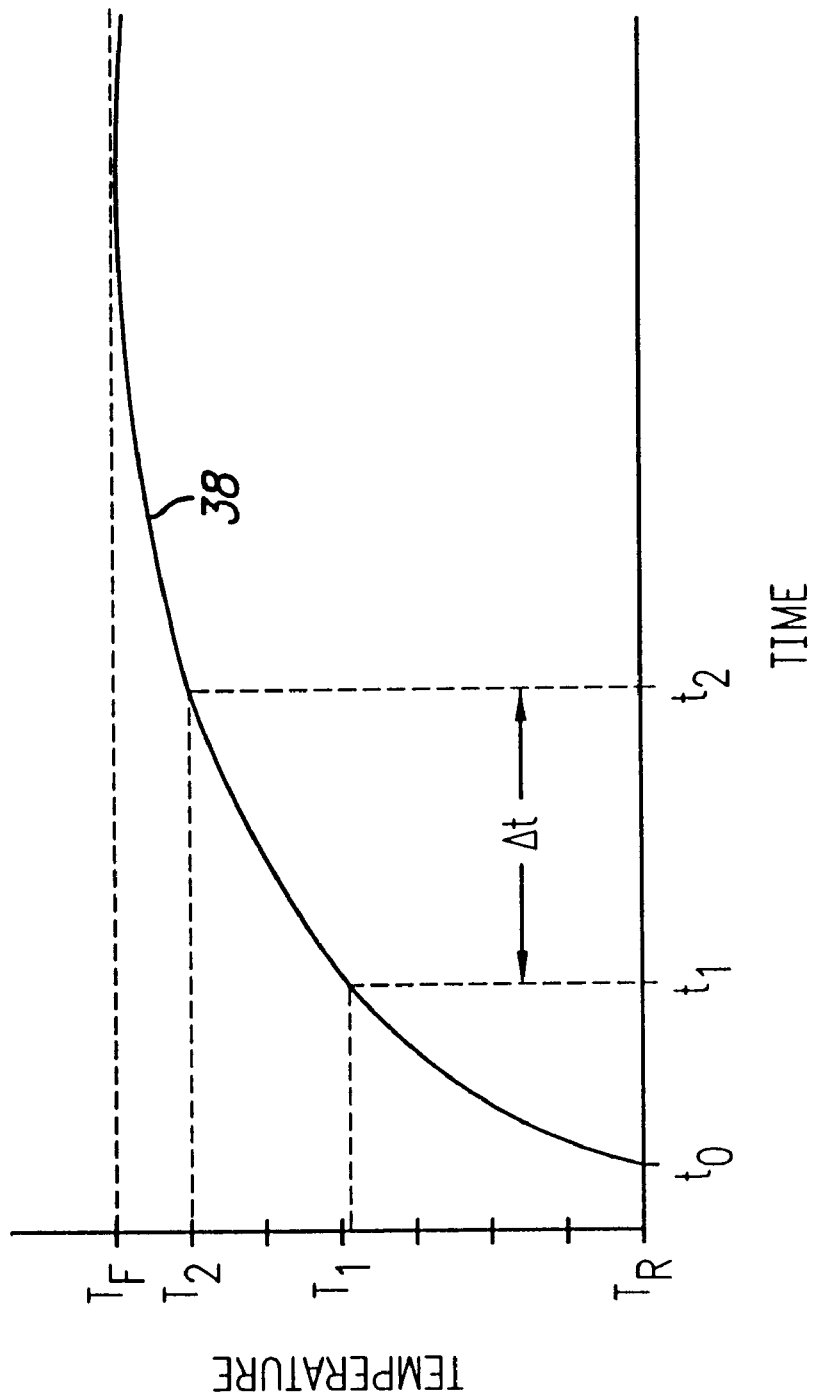
FIG. 3 presents a graph of a typical thermistor response curve to a temperature that differs from, and is higher than, its own temperature.

Referring now to FIG. 3, a graph of measured temperature 38 plotted as a function of measurement time for a measurement system is shown. Although the relationship illustrated is similar in form to that specified by Equation 1, the measurement system of the present invention does not exhibit first order heat transfer behavior and therefore the curve 38 differs from the simple exponential function of Equation 1. As discussed above, the temperature indicated 38 by the thermistor lags the actual temperature $T_F$ of the subject being measured. This lag is shown by line 38. It can be seen that as the measurement progresses from a start time, $t_0$, the temperature rapidly increases from $T_R$ to $T_1$ between times $t_0$ to $t_1$. The rate of increase in the indicated temperature 38 is reduced between times $t_1$ and $t_2$, and the temperature line 38 gradually tends toward the stabilization temperature $T_F$ asymptotically as the time increases even more. As discussed above, the present invention is directed to a system capable of analyzing the temperature data gathered during an early period of the measurement, for example, between times $t_1$ and $t_2$, and predicting the final temperature $T_F$.

Figure 4:
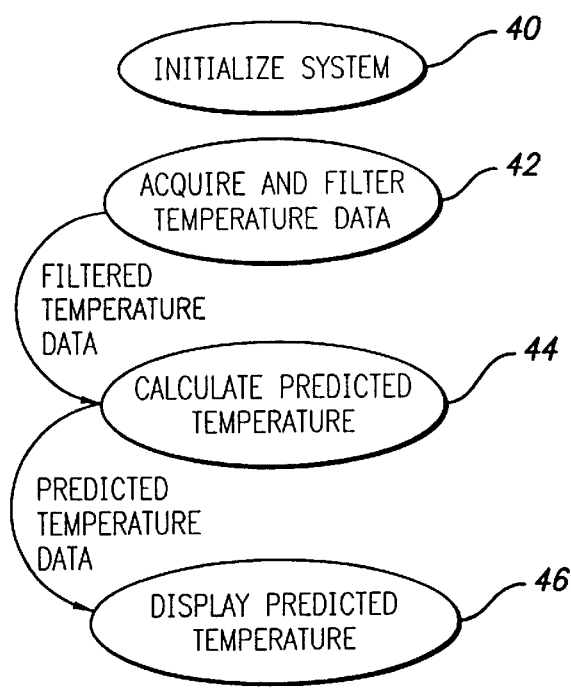
FIG. 4 is a diagram illustrating data flow and tasks performed by the system depicted in FIG. 2 which incorporates aspects of the invention.
Figure 5:
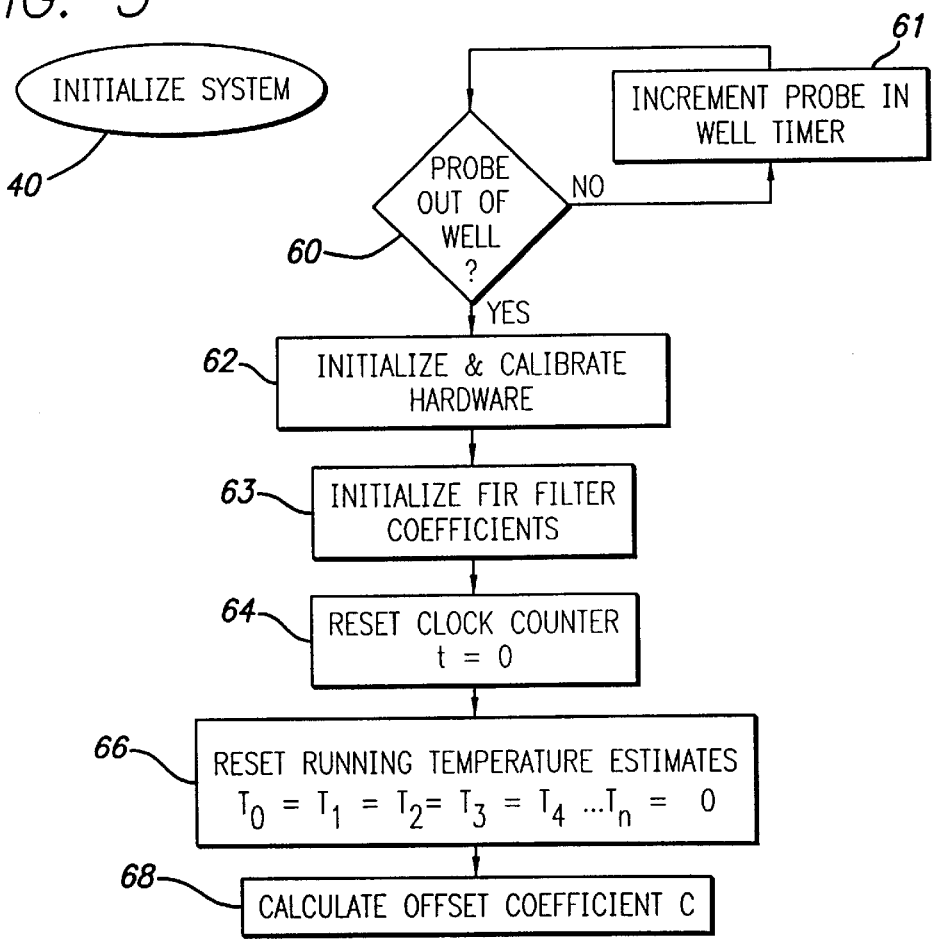
FIG. 5 is a diagram illustrating the Initialize System task of FIG. 4.
Figure 6:
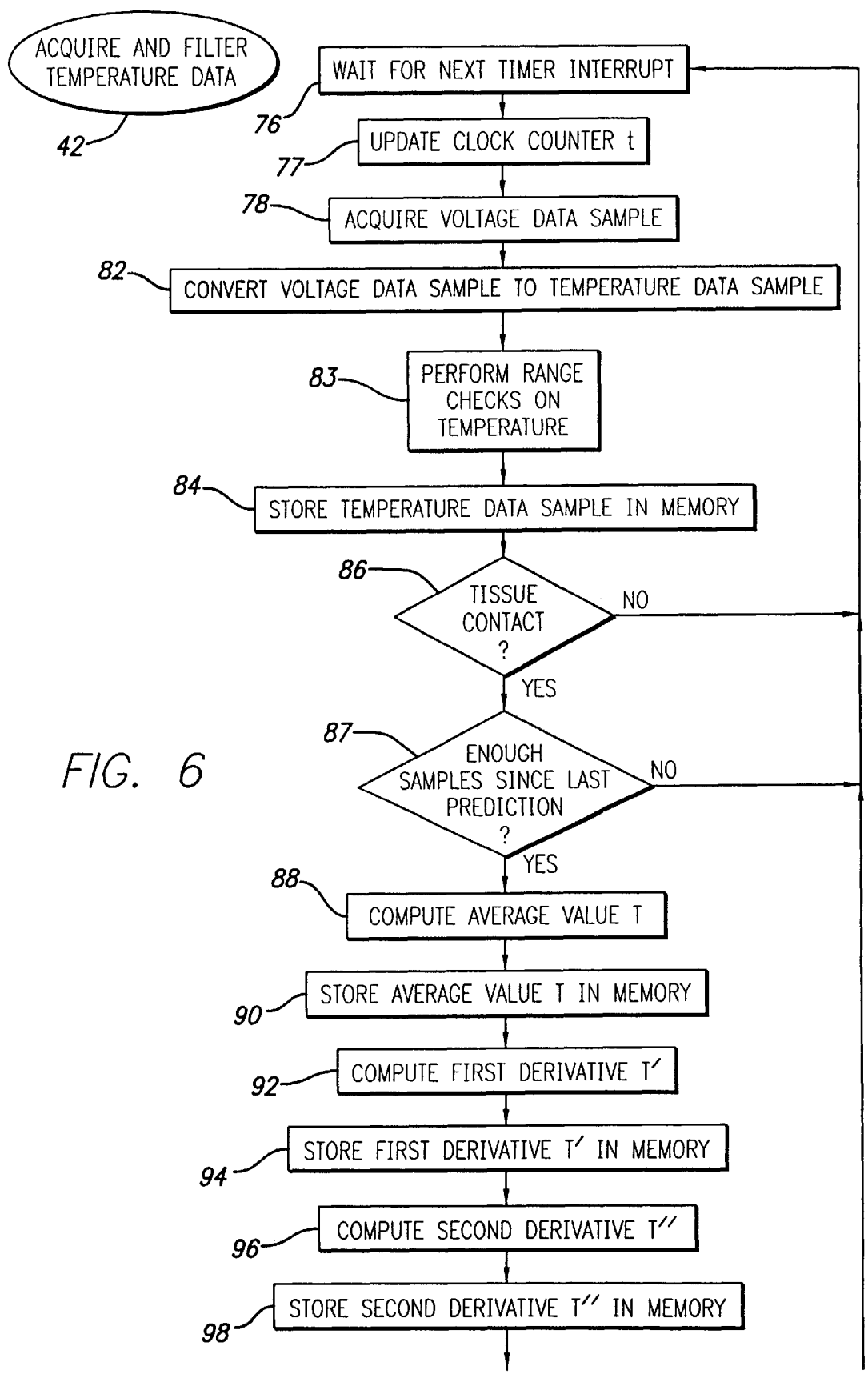
FIG. 6 is a diagram illustrating the Acquire and Filter Temperature Data task of FIG. 4.
Figure 8:
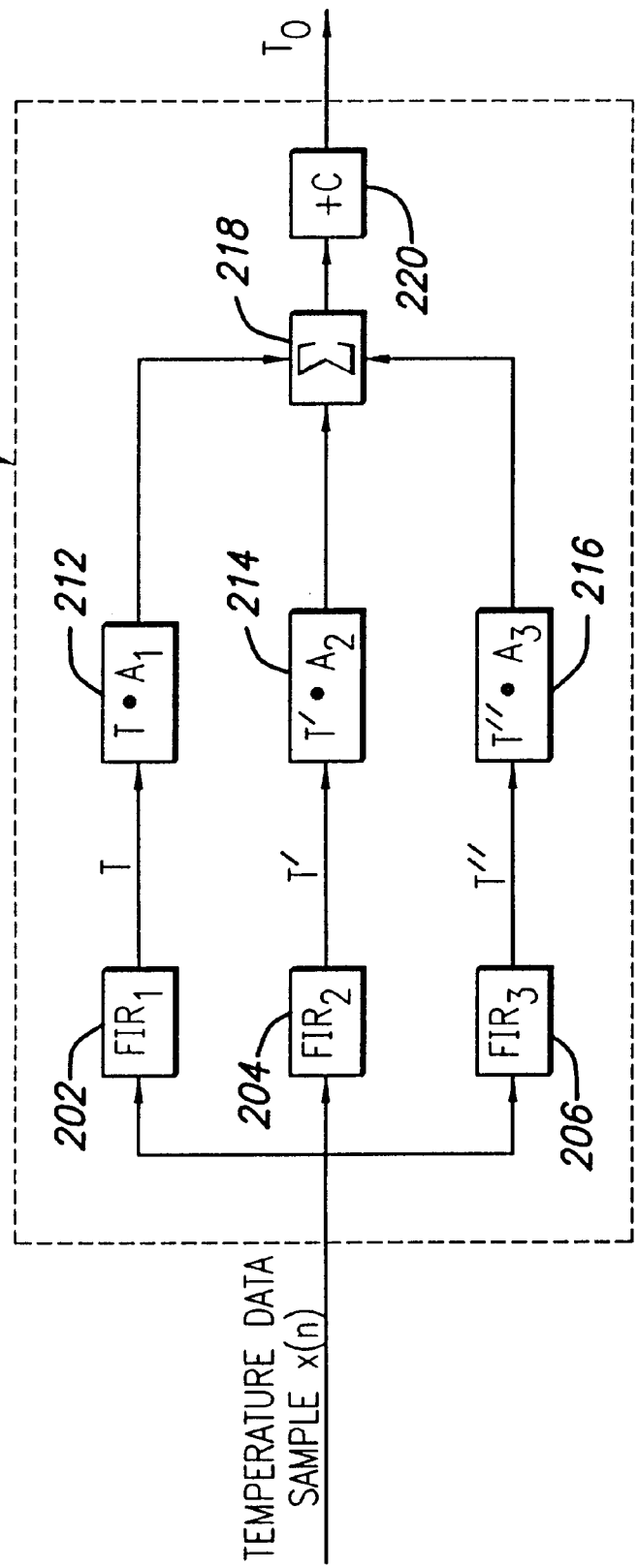
FIG. 8 is a block diagram of the processor functions performed by the system in accordance with aspects of the invention as depicted in FIG. 2.

Referring now to FIG. 4, the general functions (tasks) of an embodiment of the system in accordance with aspects of the invention are shown, along with the data that flows among them. A data flow does not imply an activation sequence; control and activation are not shown on this diagram. The subsequent flow diagrams, FIGS. 5 and 6, illustrate the sequential flow of certain key tasks. The data flows are labeled with the data that is provided to one task by another. FIG. 8 presents the temperature computation functions performed by the processor 28.

With continued reference to FIG. 4, the Initialize System task 40 is run each time the thermometer is activated. It serves to execute all logic that needs to occur only once per measurement. It activates the Acquire and Filter Temperature Data task 42, which in turn activates the Calculate Predicted Temperature task 44. Once the predicted temperature has been calculated, it is displayed by the Display Predicted Temperature task 46.

FIG. 5 provides a flow diagram for the Initialize System task 40. It is initiated when a probe is removed from the well 60 and initializes, tests, and calibrates the hardware devices 62, initializes the FIR (finite impulse response) filter coefficients 63, and resets the clock counter "t=0" 64 and the running temperature estimates $T_0$, $T_1$, $T_2$, $T_3$, and $T_4$ 66 to equal zero. The task 40 then proceeds to the Calculate Offset Coefficient C task 68.

If the probe is not out of the well in step 60, the task continues to increment the probe in the well timer 61. In accordance with this step, the amount of time that the probe 12 is in the well 17 of the body 16 is monitored to determine if the probe is at ambient temperature. If the probe has not been in the well 17 for a certain time period, such as one minute, the measurement system assumes that the probe is not at ambient temperature and a previously-saved ambient temperature is used. If the probe has been in the well 17 for more than a minute, it is considered to be at ambient temperature.

In an alternative embodiment, the Initialize System task 40 may be triggered by other events, such as a rapid rise in the temperature of the probe signifying contact with the patient, or the lapse of a preselected length of time following the removal of the probe from the well, or the activation of the switch 36 (FIG. 2).

In step 68, the offset coefficient C is calculated 68 as shown in Equation 4 below:

$$C = B_0 + (B_1 \times T_a) + (B_2 \times T_a^2) \qquad \text{(Eq. 4)}$$

where:

$T_a$ is the ambient temperature, and parameters $B_0$, $B_1$ and $B_2$ are constant weighting factors empirically derived through the use of well known statistical regression techniques upon a large sample of actual clinical data.

The offset coefficient C is used to factor the ambient temperature into the calculation of the predicted temperature, as detailed elsewhere in the specification. The calculation of the offset factor C, as shown in Equation 4 above, thus relies on the assumption that the initial temperature reading is equal or nearly equal to the ambient temperature $T_a$ in the environment where the thermometer is to be used, and the algorithm determines whether to actually measure $T_a$ or to use a previously stored value.

FIG. 6 provides a flow diagram for the Acquire and Filter Temperature Data task 42. The illustrated steps, once initiated, are carried out with precise timing and without interruption to ensure no loss of data and no timing inaccuracy. The processor 28, timer 30, and analog-to-digital converter 26 (FIG. 2) acquire and filter incoming temperature sensor data to remove line noise and other interference that may affect the quality of the temperature determination. Various techniques well known in the area of signal processing may be used in this process.

In a preferred embodiment, with each timer interrupt 76, the system updates the clock counter 77 and acquires voltage input 78. This voltage is related to the resistance, and thus the temperature, of the thermistor at the probe tip. A typical mathematical relationship applied to this voltage converts it to a temperature value 82. The system then performs range checks 83 on the temperature for the purpose of determining if the thermometer is broken or poses a possible hazard. Thresholds are set and if the thermometer provides a reading outside these thresholds, the probe is considered to be broken. As an example, if the probe reads less than 32 degrees or greater than 500 degrees F., the probe is considered to be broken (an open circuit or short circuit for example). If the probe reads at a temperature of 115 degrees F., it is considered a hot probe and a hazard alarm is provided.

Temperature data samples are stored 84 in the memory 32. The mathematical relationship between the resistance of the thermistor and the temperature takes into account the thermistor characterization data supplied by its manufacturer, along with the particular circuit details having to do with the interconnection of the thermistor to the analog-to-digital converter, and is well-known to those skilled in the art.

After the temperature value is stored in memory 84, the system determines if tissue contact exists 86 by analyzing temperature data for a temperature above 94 degrees F.

Other approaches may be used to determine tissue contact. If contact does not exist, the system waits for the next timer interrupt 76 and repeats the above process until tissue contact is determined 86. At the time that tissue contact is detected, depending on whether enough samples have been acquired or not 87 the system then either awaits the next interrupt 76 to acquire another data sample 78 (if enough samples have not been acquired) or proceeds to calculate the estimate of steady state temperature $T_0$. In a preferred embodiment the timer runs at 0.1 second intervals and the system acquires twenty-one samples over a period of time of approximately two seconds prior to commencing to calculate the current temperature estimate $T_0$. This number of samples and sampling rate are currently known to provide the best compromise between temperature prediction accuracy and acceptable measurement time. During this period of time, the temperature signals provided by the probe rise along a curve approaching the temperature of the patient asymptotically and the current temperature estimate $T_0$ is calculated by Equation 5 shown below:

$$T_0 = A_1 T + A_2 T' + A_3 T'' + C \qquad \text{(Eq. 5)}$$

where:

T is the average value of the temperature based upon the twenty-one data samples stored in memory, T' is the first derivative, or slope, of the temperature curve described by the twenty-one samples stored in memory, T'' is the second derivative, or curvature, of the temperature curve described by the twenty-one samples stored in memory, Parameters $A_1$, $A_2$ and $A_3$ are empirically derived constant weighting factors, and C is the offset coefficient dependent on ambient temperature discussed previously.

Ideally, the number of actual clinical temperature data samples used in deriving parameters $A_1$, $A_2$, $A_3$, $B_0$, $B_1$, and $B_2$ should be as large as possible and the measured temperatures should be uniformly spread over the entire range of temperatures of potential interest, i.e. the entire range of temperatures that may be encountered by a thermometer according to the invention. However, by necessity the number of temperature data samples obtained was relatively limited and, furthermore, the majority of the temperatures measured were in the normal body temperature range. In particular, the clinical data employed consisted of approximately 240 temperature data samples that ranged from 95.5 to 104 degrees F. (35.3 to 40 degrees C.) measured at an ambient temperature ranging from 60 to 92 degrees (16 to 33 degrees C.).

For this reason, standard regression analysis applied to these data samples produced parameters that tended to predict too low at high actual temperatures and predict too high at low actual temperatures, with a predicted temperature error that exhibited a trend, or relationship, with the stabilization temperature $T_F$ which is essentially equal to the actual body temperature of the patient. Because the difference between the measured temperature T(t) and the actual temperature $T_F$ tends to be a function of the slope T'(t) and the curvature T''(t) of the measured temperature rather than of the measured temperature T(t) itself, parameter $A_1$ was artificially constrained to equal 1.0 in order to eliminate the trend exhibited by the error in the computed temperature $T_0$. Thus, the remaining five parameters $A_2$, $A_3$, $B_0$, $B_1$, and $B_2$ were computed by regression analysis of the clinical data to yield the most accurate predictions, in terms of the lowest mean squared prediction error, across the measured temperatures, and in a preferred embodiment their values are:

$A_1=1.0$  $B_0=15.8877$ $A_2=7.6136$  $B_1=-0.3605$ $A_3=8.87$  $B_2=0.002123$ (Eq. 5.1)

With continued reference to FIG. 6, once it is determined that tissue contact has been established 86 and a preselected number of samples (e.g. five) have been acquired 87 since the last temperature estimate has been calculated, the system proceeds to compute the average value T of the temperature 88 and store it in memory 90, compute the first derivative T' of the temperature 92 and store it into memory 94, compute the second derivative T" of the temperature 96 and store it into memory 98, and then finally compute the current temperature estimate $T_0$ by Equation 5 defined above.

Figure 7:
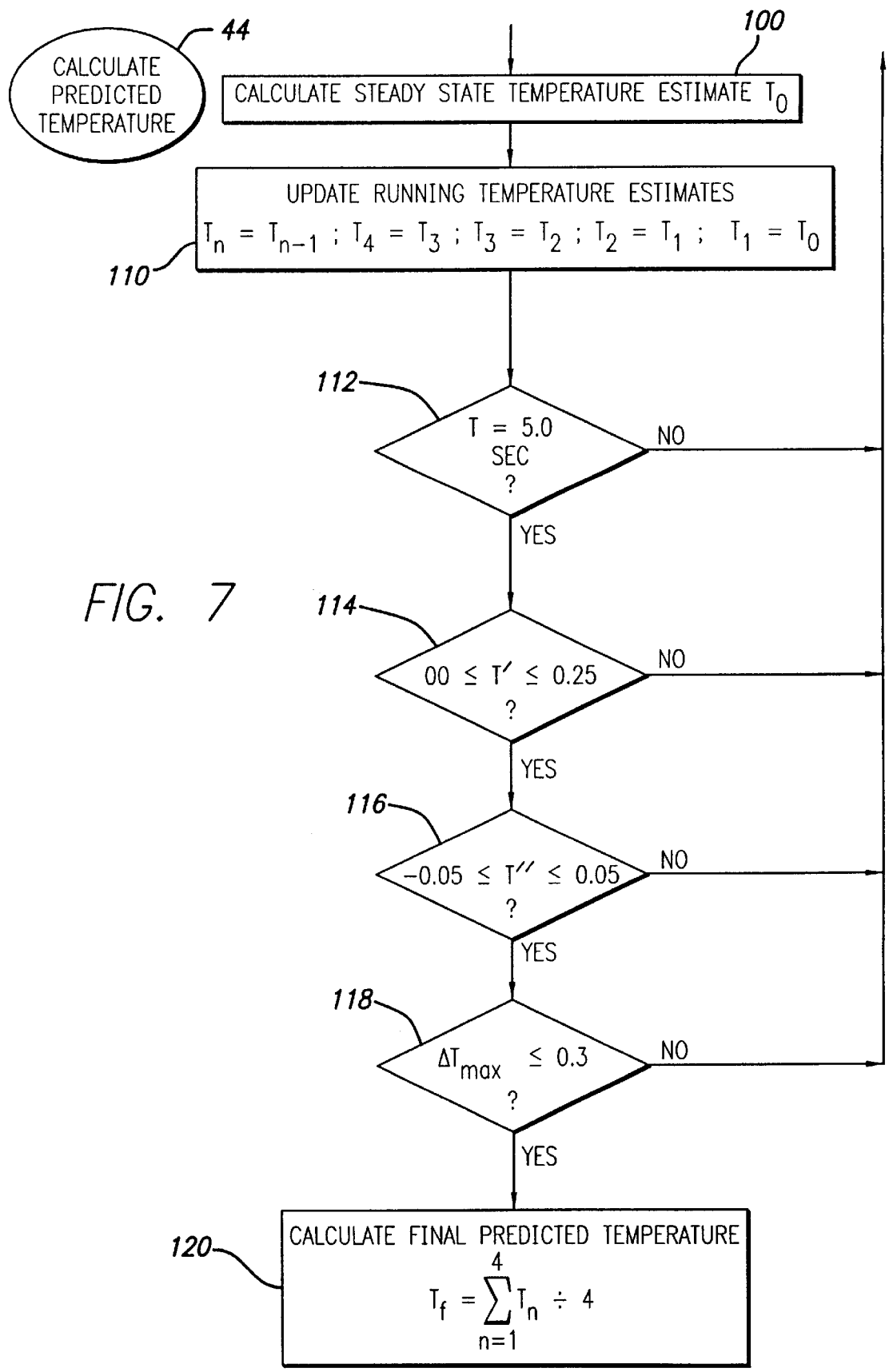
FIG. 7 is a diagram illustrating the Calculate Predicted Temperature task of FIG. 4.

Referring now to FIG. 7, a flow diagram for the Calculate Predicted Temperature task 44 is shown. This task is performed immediately after the Acquire and Filter Temperature Data task 42 which, as shown in FIG. 4, provides filtered and processed data to the Calculate Predicted Temperature task 44. The first steps entail calculating a prediction 100 and updating the running temperature estimates 110, which are the last four predicted temperatures $T_1$, $T_2$, $T_3$, and $T_4$ in this case, although other numbers of predicted temperatures may be used in other embodiments. The temperature prediction process of the present invention is performed continuously by the system once the initial twenty-one data points have been acquired (see discussion elsewhere in the specification regarding the use of finite impulse response filters), and a new temperature prediction is computed with every additional five (in this embodiment) data points consequently acquired. Therefore, a new predicted temperature (i.e. the current temperature estimate $T_0$) is calculated with every five clock cycles, and thus the oldest of the running temperature estimates $T_4$ (or $T_N$, depending on how many temperature estimates N are employed) must be discarded in favor of $T_0$ by shifting all values over by one from $T_1$ to $T_4$ and finally updating $T_1$ with the value of $T_0$.

The purpose of tracking the last four (or N) temperature estimates is to better determine the first instant when a sufficiently accurate temperature prediction can be posted to the display by determining when an optimal balance between prediction accuracy and elapsed time has been reached. Determining such an optimal balance must take into account various parameters, such as a predetermined minimum waiting time; the number of temperature data samples used to calculate the temperature mean T(t), slope T'(t), and curvature T"(t); a predetermined maximum slope T'(t); a predetermined maximum and minimum curvature T"(t); a predetermined maximum deviation among the running temperature estimates; and a predetermined number of prior predictions to consider for consistency.

As shown in FIG. 7, in the preferred embodiment of the present invention four such conditions were chosen for determining when the optimal balance between prediction accuracy and elapsed time has been reached. Namely, a minimum waiting time t, a maximum slope T'(t), a maximum and minimum curvature T"(t), and a maximum deviation among the running temperature estimates are determined. Each of these conditions must be met before the Display Predicted Temperature task 46 is activated. Thus, as shown in FIG. 7, in the preferred embodiment at least 5 seconds must have passed 112 since the probe was first activated and placed in contact with the patient's body to ensure that transients have died out. Next, the first derivative T' must have a positive value no larger than 0.25 degrees F. (0.14 degrees C.) per second 114 to ensure that the temperature is not rising too quickly and that it is therefore "leveling off" and approaching steady state. Third, the second derivative T" must also be between minus and plus 0.05 degrees F. (0.028 degrees C.) per second per second 116, again to ensure proper convergence toward the steady state temperature. Fourth, the difference between any two of the running temperature estimates $T_1$, $T_2$, $T_3$, and $T_4 \ldots T_N$ must be no greater than 0.3 degrees F. (0.17 degrees C.) 118 in the present embodiment to ensure the accuracy of the final prediction. If any of these conditions is not met, the system initiates the Acquire and Filter Temperature Data task 42 to acquire the next temperature data sample point and recalculate the current temperature estimate $T_0$. The preferred values for these four conditions, as presented above, were determined empirically to provide an optimal compromise between the time necessary to compute the prediction and its accuracy.

When all four conditions have been met, the system proceeds to calculate the final temperature estimate $T_f$ 120 by averaging the four running temperature estimates $T_1$, $T_2$, $T_3$, and $T_4$. $T_f$ is the temperature predicted by the system, and as shown in FIG. 4 the Display Predicted Temperature task 46 can now be activated to display $T_f$ upon the display 18 of the thermometer 10 (FIG. 1). By implementing these multiple conditions, the system of the invention substantially ensures the improved accuracy of the final result by evaluating the uniformity of the temperature data obtained over time and identifying the earliest instant at which the predicted temperature offers a sufficient degree of certainty to be displayed and thus relied upon by the user of the thermometer.

In a preferred embodiment the processor 28 (FIG. 2) is provided with finite impulse response ("FIR") digital filters to perform the computations necessary to determine T, T' and T". FIR filters are typically configured to operate upon a string of K numerical values by multiplying each value with a predetermined coefficient $h_k$. In a preferred embodiment, the filter is implemented by a computer program and the CPU 28 memory 32 is used for storage. In another embodiment, the filter may comprise K registers connected in a linear configuration and, as each new value is acquired and fed to the filter, the new value is stored in the first register and all previously acquired values are shifted one register over such that eventually the first acquired value is stored in the last register. Each register k has a coefficient $h_k$ associated with it, and as a new value is shifted into each register, that value is multiplied with the coefficient $h_k$ associated with the particular register. In the present implementation these steps are performed by software, and the processor memory 32 is utilized to store the register values.

The output of a FIR filter is equal to the sum of the values in all of the filter's registers multiplied by the respective coefficients $h_k$ associated with each register. Thus, generally speaking, given an input sequence x(n), n=0, 1, 2 . . . K, a FIR filter with coefficients $h_0, h_1, \ldots h_K$ will provide a filtered output signal y(n) as follows:

$$y(n) = \sum_{k=0}^{K-1} h_k \times x(n-k)$$ (Eq. 6.1)

wherein:

$h_{k(k=0 \ldots K-1)}$=set of coefficients for the particular FIR filter,

K=number of coefficients for the FIR filter, k=index x(n) corresponds to the value of the last temperature data sample acquired and fed to the filter.

Thus, through the use of the proper coefficients, FIR filters can be programmed to extract the average value T, the slope T', and the curvature T" of the sample data curve from the temperature data sample points acquired and stored by the system. These coefficients can be readily derived for an input sequence of twenty-one data points using known mathematical methods and, for a system of twenty-one samples (n=−10, −9 . . . 10, where n=10 is the most recent sample) acquired at 0.1 second intervals, the coefficients for the FIR filters are as shown in the following equations:

$$T = \sum_{n=-10}^{10} \frac{1}{21} \times x(n) \quad \text{(Eq. 6.2)}$$

$$T' = \sum_{n=-10}^{10} \frac{n}{0.1 \times 770} \times x(n) \quad \text{(Eq. 6.3)}$$

$$T'' = \sum_{n=-10}^{10} \frac{2 \times \left(n^2 - \frac{770}{21}\right)}{0.1^2 \left(50666 - \frac{770^2}{21}\right)} \times x(n) \quad \text{(Eq. 6.4)}$$

where:

$$\sum_{n=-10}^{10} n^2 = 770 \quad \text{(Eq. 6.5)}$$

$$\sum_{n=-10}^{10} n^4 = 50666$$

With reference to FIG. 8, a block diagram depicting the operation of the processor, including the FIR filters, is shown. The last temperature data sample acquired x(n) is provided by the analog/digital converter (not shown) to the processor 28, where it is simultaneously fed to FIR circuits $\text{FIR}_1$ 202, $\text{FIR}_2$ 204, and $\text{FIR}_3$ 206, which are configured to calculate the average value T, slope T', and curvature T", respectively, of the last twenty-one temperature data points provided by the analog/digital converter, including x(n). The average value T, slope T', and curvature T" are each multiplied by the respective weighting factor $A_1$ 212, $A_2$ 214, and $A_3$ 216, as per Equation 5 above, and then summed together 218. Finally, the offset factor C, which as detailed previously is a function of the ambient temperature $T_a$, is added 220 to the sum of the weighted average value T, slope T', and curvature T" to calculate the current temperature estimate $T_0$.

It must be noted that the curvature T"(t) may also be computed by calculating the slope of the slope T'(t) by concatenating two slope calculating filters $\text{FIR}_2$. Such an approach, however, was not selected for use in the preferred embodiment of the invention because it would require calculating the slope T'(t) prior to, rather than simultaneously with, the curvature T"(t), and would thus cause delays in computing the final temperature.

By employing FIR filters to derive the average value, slope, and curvature of the temperature data, the system of the invention can utilize a rather sophisticated algorithm for predicting temperature with readily available, relatively inexpensive mathematical processors, such as commonly available eight-bit processors. As one example, the eight-bit processor having a part no. of UPO 78064 from NEC may be used. Lastly, the algorithm of the invention was fine tuned by applying it to actual data to empirically derive weighting factors that provide the most accurate results over the widest range of final, steady state temperatures.

In an alternative embodiment of the present invention, a single FIR filter may be programmed to extract the weighted sum of the temperature mean T(t), slope T'(t), and curvature T"(t). However, the use of a single FIR filter would not allow the individual extraction of the mean T(t), slope T'(t), and curvature T"(t) from the sampled data and therefore these parameters could not be individually monitored to determined when the optimal balance between prediction accuracy and elapsed time has been reached, as previously discussed. Furthermore, the use of individual FIR filters allows for the individual adjustment of each of these parameters such as, for example, adjusting the size of each FIR filter to obtain a particular amount of smoothing for each parameter.

While one form of the invention has been illustrated and described, it will be apparent that further modifications and improvements may additionally be made to the device and method disclosed herein without departing from the scope of the invention. Accordingly, it is not intended that the invention be limited, except as by the appended claims.

What is claimed is:

1. A thermometer for measuring the temperature of an object, comprising:
    a sensor which, when positioned to sense the temperature of the object, provides a time varying temperature signal in response to the temperature of the object;
    a processor connected so as to sample the temperature signal a predetermined number of times, to determine the average value, the first derivative, and the second derivative of the temperature signal based upon the predetermined number of samples acquired, and to combine the average value, first derivative, and second derivative to calculate an estimate of the temperature of the object and provide an estimated final temperature signal; and
    a display connected with the processor to receive and display the estimated final temperature signal.

2. The thermometer of claim 1 wherein the processor further applies a separate weighting factor to each of the average value, the first derivative, and the second derivative prior to combining the average value, the first derivative, and the second derivative to calculate the temperature estimate.

3. The thermometer of claim 2 wherein the predetermined number of samples are acquired over a predetermined time frame.

4. The thermometer of claim 3 wherein the processor samples the temperature signal around twenty-one times over a time frame of approximately two seconds to determine the average value, the first derivative, and the second derivative of the signal.

5. The thermometer of claim 3 wherein the processor continuously samples the signal after acquiring an initial predetermined number of samples and continuously recalculates the temperature estimate based on the last selected number of samples acquired as each new sample is acquired.

6. The thermometer of claim 5 wherein the thermometer displays on the display a final temperature estimate calculated by the processor after the sensor has been in contact with the object for a predetermined length of time.

7. The thermometer of claim 5 wherein the thermometer displays on the display a final temperature estimate calculated by the processor only if the last value of the first derivative calculated by the processor lies in a predetermined range of values.

8. The thermometer of claim 5 wherein the thermometer displays on the display a final temperature estimate calculated by the processor only if the last value of the second derivative calculated by the processor lies in a predetermined range of values.

9. The thermometer of claim 5 wherein the final temperature estimate displayed by the thermometer is equal to the average of a selected number of the temperature estimates calculated by the processor.

10. The thermometer of claim 5 wherein the thermometer displays on the display a final temperature estimate only if the maximum difference between any two of a predetermined number of last temperature estimates calculated by the processor is less than a predetermined value.

11. A thermometer for measuring the temperature of a biological subject comprising;
   a sensor which, when positioned to sense the temperature of the subject, provides a time varying temperature signal in response to the temperature of the subject;
   a processor comprising a finite impulse response filter connected so as to sample the temperature signal a selected number of times, to determine an average value, a first derivative, and a second derivative of the temperature signal based upon the selected number of samples acquired, the processor also configured to combine the average value, first derivative, and second derivative to calculate an estimate of the temperature of the subject and provide an estimated final temperature signal;
   wherein the processor recalculates the temperature estimate based on a selected number of new samples acquired by the processor later in time, thereby generating a plurality of temperature estimates; and
   a display connected with the processor to receive and display the display the estimated final temperature signal only if the difference between any two of a selected number of the temperature estimates calculated by the processor is less than a predetermined value.

12. The thermometer of claim 11 wherein the thermometer displays on the display a final temperature estimate calculated by the processor after the sensor has been in contact with the subject for a predetermined length of time.

13. The thermometer of claim 11 wherein the thermometer displays on the display a final temperature estimate calculated by the processor only if the last value of the first derivative calculated by the processor lies in a predetermined range of values.

14. The thermometer of claim 11 wherein the thermometer displays on the display a final temperature estimate calculated by the processor only if the last value of the second derivative calculated by the processor lies in a predetermined range of values.

15. The thermometer of claim 11 wherein the final temperature estimate displayed by the thermometer is equal to the average of a selected number of the temperature estimates calculated by the processor.

16. The thermometer of claim 11 wherein the processor further adds an ambient temperature offset coefficient to the sum of the weighted average value, first derivative, and second derivative to calculate the temperature estimate.

17. The thermometer of claim 16 wherein:
   the sensor further provides an initial signal corresponding to the ambient temperature; and
   the process further determines the square of the ambient temperature, applies a separate weighting factor to each of the ambient temperature and the square of the ambient temperature, and combines the weighted value of the ambient temperature with the weighted square of the value of the ambient temperature to calculate the ambient temperature offset coefficient.

* * * * *

UNITED STATES PATENT AND TRADEMARK OFFICE
CERTIFICATE OF CORRECTION

PATENT NO. : 6,698,921 B2
DATED : March 2, 2004
INVENTOR(S) : Robert J. Siefert

It is certified that error appears in the above-identified patent and that said Letters Patent is hereby corrected as shown below:

Column 12,
Delete lines 19 through 35 and insert:
-- A thermometer for measuring the temperature of an object, comprising:
    a sensor which, when positioned to sense the temperature of the object, provides a time varying temperature signal in response to the temperature of the object;
    a processor comprising a finite impulse response filter connected so as to sample the temperature signal, and from the samples, to determine an average value, a first derivative, and a second derivative of the temperature signal based upon a selected number of the samples acquired, and to combine the average value, first derivative, and second derivative to calculate an estimate of the temperature of the object and provide an estimated final temperature signal; wherein the processor recalculates the temperature estimate based on a selected number of new samples acquired by the processor later in time, thereby generating a plurality of temperature estimates; and
A display connected with the processor to receive and display the estimated final temperature signal. --.

Column 12,
Line 41, delete "predetermined" and insert -- selected --.

Column 13,
Line 31, delete first occurrence of "display the".

Column 14,
Line 26, delete "process" and insert -- processor --.

Signed and Sealed this

Fourteenth Day of September, 2004

JON W. DUDAS
*Director of the United States Patent and Trademark Office*